United States Patent [19]

Kajiwara et al.

[11] 4,454,408

[45] Jun. 12, 1984

[54] METHOD FOR CONTROLLING ARC WELDING AND APPARATUS THEREFOR

[75] Inventors: Ryoichi Kajiwara, Hitachi; Satoshi Kokura, Hitachiohta; Yuzo Kozono; Akira Onuma, both of Hitachi, all of Japan

[73] Assignee: Hitachi, Ltd., Tokyo, Japan

[21] Appl. No.: 286,842

[22] Filed: Jul. 27, 1981

[30] Foreign Application Priority Data

Jul. 25, 1980 [JP] Japan .................. 55-101184

[51] Int. Cl.³ ............................ B23K 9/10
[52] U.S. Cl. .................. 219/124.34; 219/130.01; 219/130.51
[58] Field of Search ............ 219/124.34, 130.01, 219/130.51, 130.21

[56] References Cited

U.S. PATENT DOCUMENTS

| | | | |
|---|---|---|---|
| 3,370,151 | 2/1968 | Normando | 219/130.01 |
| 3,496,327 | 2/1970 | Vilkas | 219/130.21 X |
| 3,627,972 | 12/1971 | Iceland | 219/130.21 |
| 4,092,517 | 5/1978 | Woodacre | 219/130.21 X |
| 4,348,578 | 9/1982 | Masaki | 219/130.01 |

FOREIGN PATENT DOCUMENTS 44-1824  3/1969  Japan .
0841837  6/1981  U.S.S.R. .

*Primary Examiner*—B. A. Reynolds
*Assistant Examiner*—Catherine M. Sigda
*Attorney, Agent, or Firm*—Antonelli, Terry & Wands

[57] ABSTRACT

An electric power supply in pulse form is applied between a welding electrode and workpieces. The temperature of a molten pool is measured by a radiation-type thermometer when no power supply pulse is applied, and the welding condition is controlled in response to an output signal of the radiation-type thermometer.

14 Claims, 9 Drawing Figures

METHOD FOR CONTROLLING ARC WELDING AND APPARATUS THEREFOR

BACKGROUND OF THE INVENTION

The present invention relates to a method for controlling arc welding and ana apparatus therefor, and more particularly to a method and an apparatus in which the temperature of the welded portion on the surface of a workpiece is monitored in order to accomplish high quality welding.

In general, arc welding is used for bonding two pieces of plates together. When thin plates are to be welded together, too much heat causes them to be melted down, whereas insufficient heat fails to uniformly weld them together up to the reverse sides thereof. If the welding is not effected uniformly, defects develop in the welding portion, or corrosion takes place in the gaps that develop in the poorly welded portions. In order to obtain uniform beads which are homogeneously melted up to the reverse sides, it is necessary to detect at all times the welding conditions, or the depth of penetration of the weld and control the welding apparatus. In welding workpieces whose reverse sides cannot be seen, for example pipes, however, it is required to determine relying upon the information obtained from the front surface whether the welding is effected up to the reverse sides or not. Usually, the welded condition can be best determined by detecting the temperature of the welding portion.

For example, Japanese Publication of Patent No. 44-1824 (1969) describes a welding apparatus in which an arc light of a welding electrode and a molten pool are simultaneously detected by a photocell, and the welding speed is controlled depending upon the output of the photocell. However, the above mentioned apparatus is not capable of properly judging the welding condition under different cooling conditions because the intensity of the arc light varies depending upon the welding current or arcing length, but not depending upon the cooling condition of workpieces. In particular, this tendency appears strikingly for such materials as copper and aluminum which have high heat conductivity and low melting points.

In contrast with the method of monitoring the arc light as well as the radiated waves or radiant-energy emitted from the welding portion, it is well known that a radiant-energy detector monitors the temperature at the welding portion which is remote from the arc-generating portion. For instance, U.S. Pat. No. 3,370,151 issued to Normando on Feb. 20, 1968 discloses a welding apparatus in which a radiation-type thermometer is driven in a direction perpendicular to the welding line on the weld bead at a point which is separated by a predetermined distance from the molten pool. The light emitted from the bead passes through lens and it is reflected at right angles by a reflection mirror provided in the radiation-type thermometer.

In the above apparatus, the temperature distribution of a portion which is already solidified and which is located behind a portion which is now being welded, is measured by the reflection mirror and the photocell. Furthermore, the bead width is detected from the temperature distribution, and the welding current is so controlled that the bead width becomes constant. Such system is capable of correctly measuring the temperature at the surface of the weld bead, but is not capable of measuring the width of the weld bead from the measured temperature distribution. In addition, the discrimination of the molten state is difficult.

SUMMARY OF THE INVENTION

The object of the present invention is to provide an improved welding method and apparatus.

The other object of the present invention is to provide a welding method and an apparatus which are capable of accurately measuring the temperature of the molten pool and the temperature on the surface of the materials to be welded in the vicinity of the molten pool, and which are capable of controlling the width of the weld bead and the depth of penetration thereof.

According to the present invention, a power supply is applied in the form of pulses to a welding electrode for effecting the arc welding, the temperature of a molten pool is measured while no pulse is supplied and the molten condition is controlled depending the temperature.

DESCRIPTION OF THE PREFERRED EMBODIMENTS

Figure 1:
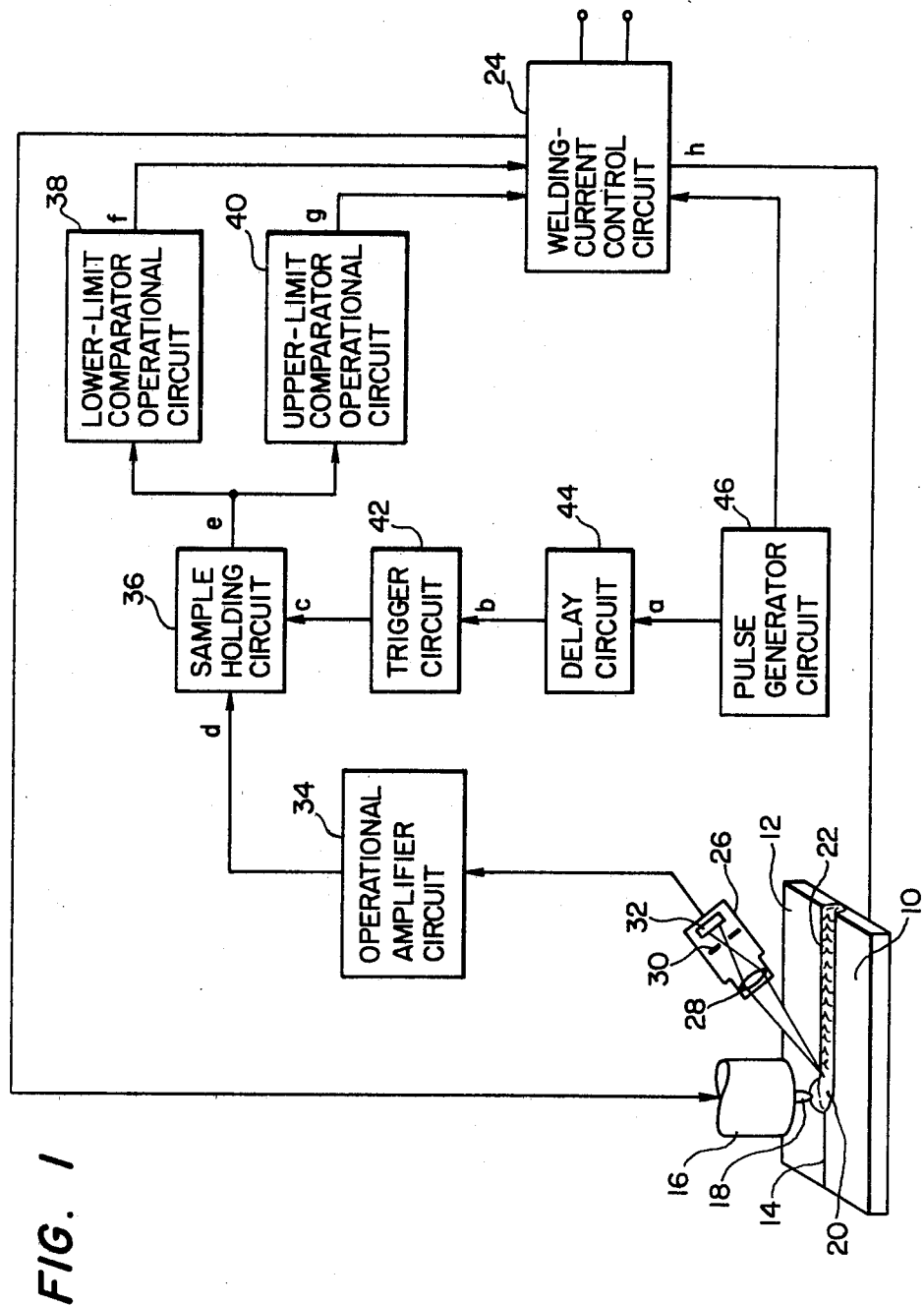
FIG. 1 is a block schematic diagram of an embodiment of the present invention.

In FIG. 1, two materials 10, 12 to be welded are butted together, and the molten pool 20 is formed by melting portions of the materials 10, 12 by establishing arc discharge between the electrode 18 of the welding torch 16 and the materials 10, 12 along the welding line 14 which runs along the abutting sides of the materials 10, 12. The molten pool 20 is caused to run along the welding line 14. Beads 22 are formed after the molten pool 20 is cooled. The welding-current control circuit is connected to the electrode 18 so that the electric power is supplied from the welding-current control circuit 24 to the electrode 18. The radiation-type thermometer 26 is provided in the vicinity of the welding torch 16 to detect the temperature of the molten pool 20 that is formed by the arc discharge by the electrode 18. The radiation-type thermometer 26 has an infrared ray sensor 32 which receives the light that is emitted from the molten pool 20 after passing through an iris 30 and a lens 28. The infrared ray sensor 32 produces a signal which corresponds to the intensity of the light emitted from the molten pool 20 to the operational amplifier circuit 34. The radiation-type thermometer 26 is connected to an operational amplifier circuit 34 which is connected to a sample holding circuit 36 that holds a voltage produced by the operational amplifier circuit 34. A lower-limit comparator operational circuit 38 and an upper-limit comparator operational circuit 40 are connected to the sample holding circuit 36. A trigger circuit 42 is connected to the sample holding circuit 36 so that it receives a signal that determines the sampling timing. The trigger circuit 42 is also connected to a pulse generator circuit 46 via a delay circuit 44. Further, the welding-current control circuit 24 is connected to the lower-limit comparator operational circuit 38 and to the upper-limit comparator operational circuit 40. The pulse generator circuits 46 feeds pulse signals to the welding-current control circuit 24.

Figure 2:
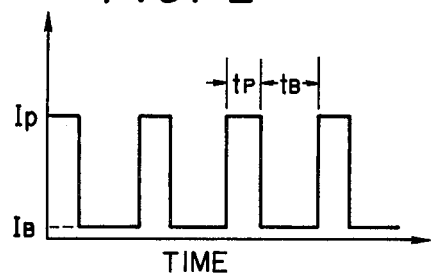
FIG. 2 is a welding current form applied to a welding electrode.
Figure 3:
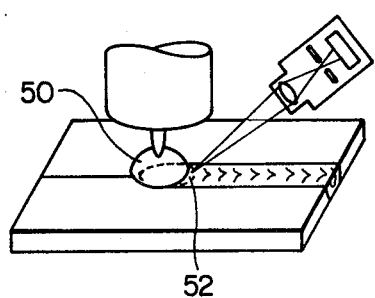
FIG. 3 is a diagram illustrating a welding portion where the arc discharge is being established.
Figure 4:
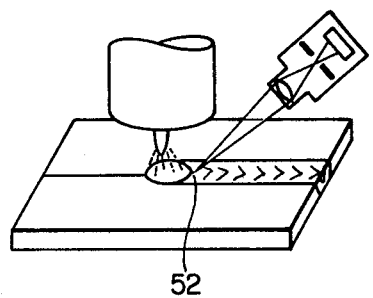
FIG. 4 is a diagram illustrating a welding portion where the arc discharge is not being established.
Figure 5A:
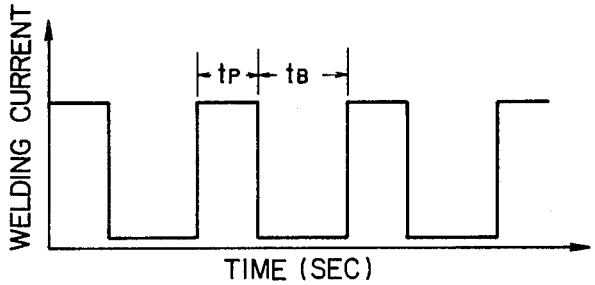
FIG. 5A is a wave form of welding pulse current applied to the electrode.
Figure 5B:
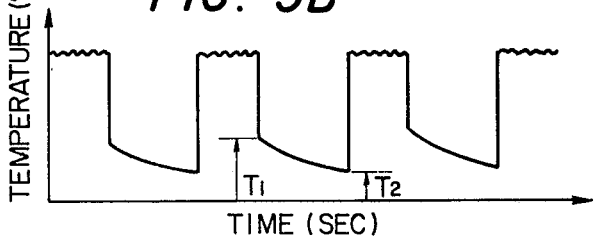
FIG. 5B is a diagram of temperature on the surface of the molten pools as measured by the radiation-type thermometer, with the welding pulse current of FIG. 5A being supplied to the welding electrode.

In the thus constructed apparatus for controlling arc welding, if now a pulse current shown in FIG. 2 is supplied to the electrode 18 of the welding torch 16, the arc 50 is generated during the period $t_p$ of FIG. 2 as shown in FIG. 3. The arc 50, however, is not generated during the period $t_B$ of FIG. 2 as shown in FIG. 4. Namely, a peak current $I_p$ is supplied during the period $t_p$ of FIG. 2, and a base current $I_B$ is supplied during the period $t_B$ of FIG. 2. When the pulse current is supplied as shown in FIG. 2, the temperature can be measured as shown in FIG. 5B. The pulse current shown in FIG. 5A is the same as the pulse current shown in FIG. 2. FIG. 5B shows the surface temperature of the molten pool 20 when the pulse current of FIG. 5A is supplied. Namely, the temperature is very high during the period $t_p$ in which a peak welding current $I_p$ flows, and it is difficult to measure the temperature since it is affected by the light of arcing. During the period $t_B$ in which the base current $I_B$ flows, however, the output value of the radiation-type thermometer 26 corresponds to the temperature of the materials to be welded; i.e., the output value is not affected by the light of arcing. Referring to FIG. 5B, the temperature decreases from $T_1$ to $T_2$ during the period of base current $I_B$, since there is no heat input from the arcing during this period, and the welded portion cools. The base current $I_B$ should be as small as possible but should be capable of reigniting the arc, and the period $(t_p+t_B)$ of the welding pulse should be longer than a response time of a temperature-measuring system. The radiation-type thermometer 26 incorporates an iris 30 in order to minimize the area for measuring the temperature, since the molten pool 20 has various temperature distributions.

Figure 6:
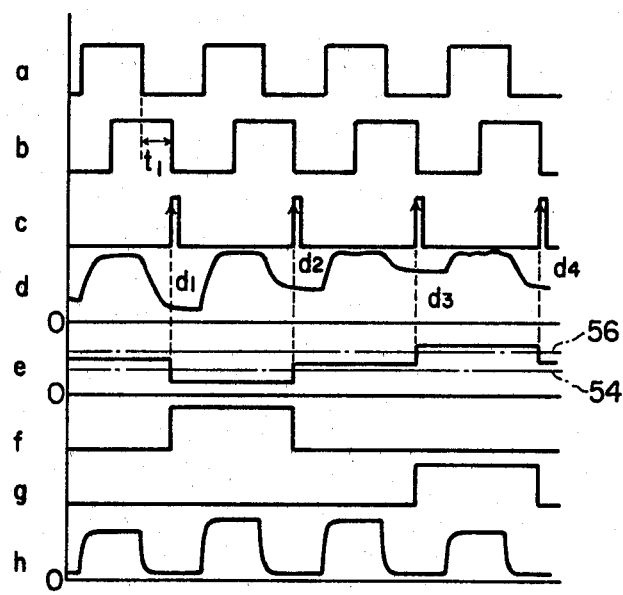
FIG. 6 is a diagram of major operation wave forms of the embodiment of FIG. 1.

Owing to the relation between the welding current and the measured results of the radiation-type thermometer, a pulse current shown in FIG. 6a having a desired welding-current waveform, e.g., having a pulse-current waveform as shown in FIG. 2, is generated by the pulse generator circuit 46, and is supplied to the welding-current control circuit 46, and is supplied to the welding-current control circuit 24 which supplies a welding pulse current shown in FIG. 6h that corresponds to the pulse waveform of FIG. 6a to the welding electrode 18. The waveform of pulse current shown in FIG. 6h is delayed as compared with the pulse waveform of FIG. 6a, being affected by the inductance of the welding circuit.

A temperature-measuring point 52 of the welding portion is positioned on the welding line behind the electrode 18 (boundary portion of the molten pool 20) in the welding direction. The temperature is measured by the radiation-type thermometer 26 and is converted into a voltage output of several volts by the operational amplifier circuit 34 of a subsequent stage as shown in FIG. 6d. The voltage output shown in FIG. 6d is sent to the sample holding circuit 36. Further, the pulses shown in FIG. 6a generated by the pulse generator circuit 46 are delayed by a time $t_1$ as shown in FIG. 6b, converted into trigger pulses by a trigger circuit 42 as shown in FIG. 6c in synchronism with the trailing edge of the pulses as shown in FIG. 6b, and are sent to the sample holding circuit 36. The delay time $t_1$ is arbitrarily selected within a range which is longer than a delay time of welding pulse current of FIG. 6h relative to the pulses of FIG. 6a but is shorter than the period in which the base current $I_B$ flows. Further, the sample holding circuit 36 samples the voltage output as shown in FIG. 6d which is related to the temperature at a moment at which the trigger pulse of FIG. 6c is introduced, and holds it for one period. The sampling output (FIG. 6e) produced by the sample holding circuit 36 is fed to the lower-limit comparator operational circuit 38 and to the upper-limit comparator operational circuit 40 to discriminate the level. When the level is lower than a lower-limit level 54 which has been set beforehand as shown in FIG. 6e, the lower-limit comparator operational circuit 38 produces a high-level signal as shown in FIG. 6f. When the level is higher than an upper-limit level 56 which has been set before hand as shown in FIG. 6e, the upper-limit comparator operational circuit 40 produces a high-level signal as shown in FIG. 6g. If now the high-level signal is produced by the lower-limit comparator operational circuit 38 as shown in FIG. 6f, the welding-current control circuit 24 so controls the welding current that a peak welding current $I_p$ supplied from the welding-current control circuit 24 to the electrode 18 is increased by one step. Further, when the high-level signal is produced by the upper-limit comparator operational circuit 40 as shown in FIG. 6g, the welding-current control circuit 24 so controls the welding current that the peak welding current $I_p$ supplied from the welding-current control circuit 24 to the electrode 18 is reduced by one step. The one step is one of many steps by which the current step-wisely increases or decreases, and the steps for increasing or decreasing the current can be arbitrarily determined. The increase or decrease of the welding current affects the depth of penetration of welding.

According to the embodiment of the present invention, therefore, the temperature of the molten pool or the temperature in the vicinity of the boundary portion can be correctly detected without being affected by the light of arcing even under such welding conditions that the molten pool is encompassed in the spread of the arcing light like when copper or aluminum materials are welded.

Furthermore, according to the embodiment of the present invention in which the welding current serves as a base current and the temperature after a predetermined period of time has passed is evaluated, it is possible to correctly judge the welded state by evaluating the temperature under the condition in which the thermal history of the heat-measuring portion is the same in each of the periods.

According to the embodiment of the present invention, furthermore, the temperature at a predetermined position behind the electrode can be maintained constant. Therefore, the portion being welded melts under a constant condition, and makes it possible to realize the welding maintaining high quality.

Figure 7:
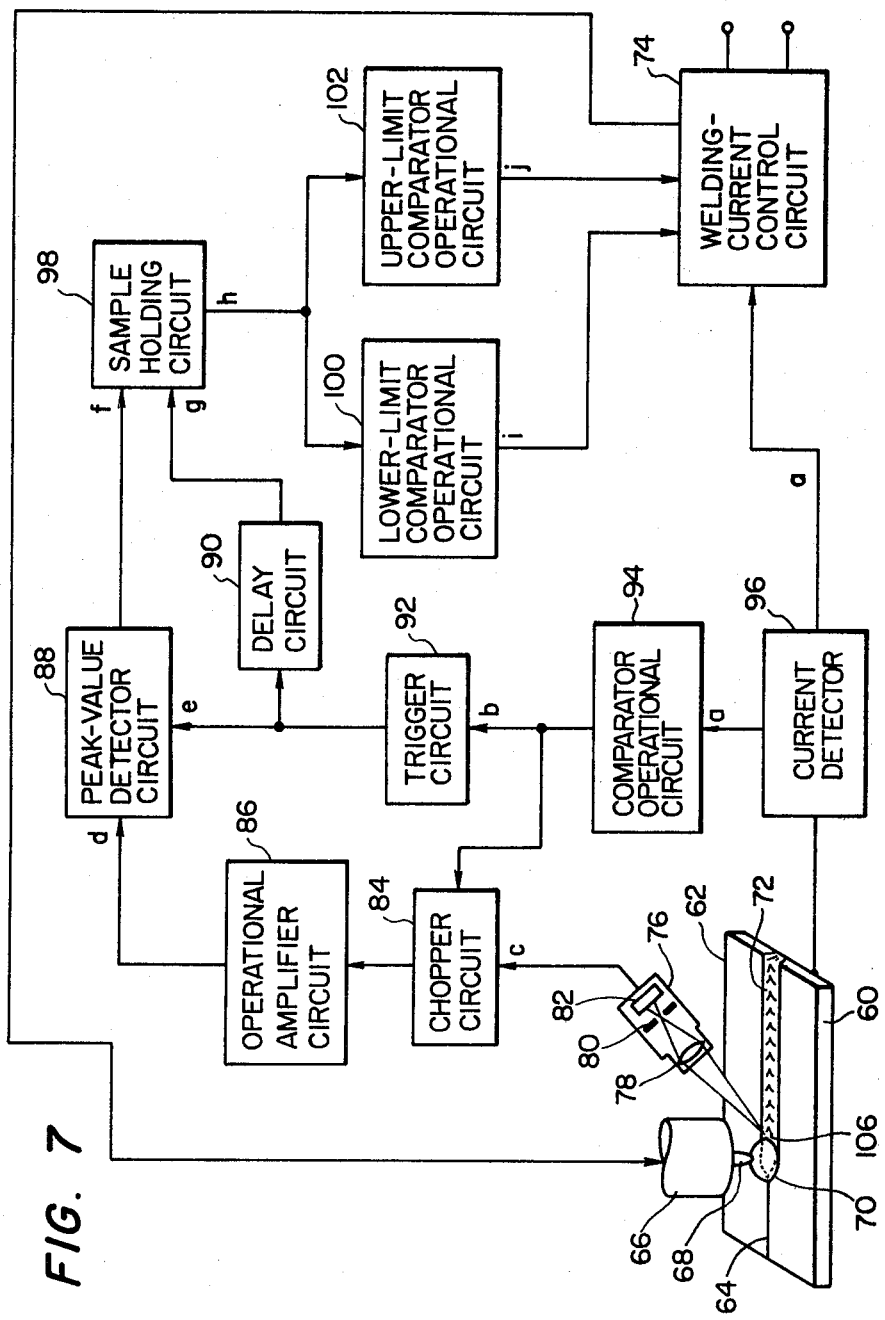
FIG. 7 is a block schematic diagram of another embodiment of the present invention.

FIG. 7 illustrates another embodiment of the present invention. According to this embodiment, arc discharge is established between the electrode 68 of the welding torch 66 and the two materials 60, 62 to be welded along the welding line 64 which forms along the butted sides of the materials 60, 62 whereby portions of the materials 60, 62 are melted to form the molten pool 70. The molten pool 70 runs along the welding line 64. Beads 72 are formed after the molten pool 70 is cooled. The welding-current control circuit 74 is connected to the electrode 68, and the electric power is supplied from the welding-current control circuit 74 to the electrode 68. The radiation-type thermometer 76 is provided in the vicinity of the welding torch 66 to detect the temperature of the molten pool 70 that is formed by the arc discharge of the electrode 68. The radiation-type thermometer 76 has an infrared sensor 82 which receives the light emitted from the molten pool 70 through the lens 78 and through the iris 80 which restricts the light. The infrared ray sensor 82 sends a signal which corresponds to the intensity of the light emitted from the molten pool 70 to a chopper circuit 84. The radiation-type thermometer 76 is connected to the chopper circuit 84 which is connected to the operational amplifier circuit 86 that is connected to a peak-value detector circuit 88. The peak-value detector circuit 88 is connected to a delay circuit 90 and to a trigger circuit 92. Further, the trigger circuit 92 is connected to the comparator operational circuit 94 which is connected to a current detector circuit 96 that detects the electric current which is supplied from the welding-current control circuit 74 to the electrode 68. The comparator operational circuit 94 sends signals to the chopper circuit 84. The output terminal of the delay circuit 90 is connected to the sample holding circuit 98 which receives signals from the peak-value detector circuit 88. The sample holding circuit 98 are connected to the lower-limit comparator operational circuit 100 and the upper-limit comparator operational circuit 102 which have been connected to the welding-current control circuit 74. The welding-current control circuit 74 includes a pulse generator.

Figure 8:
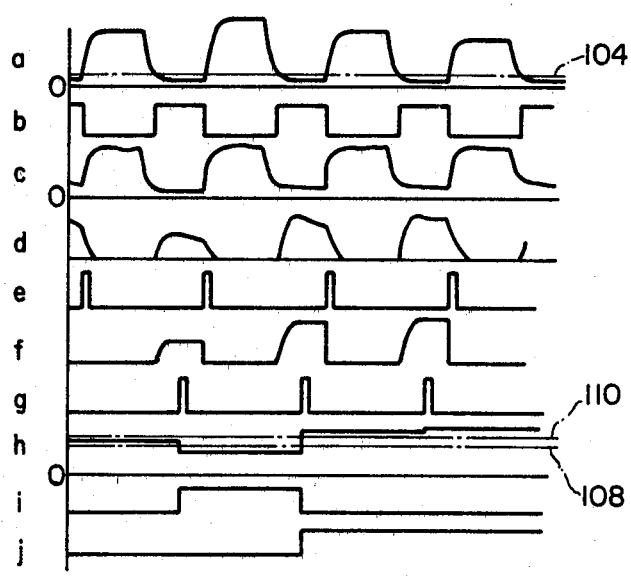
FIG. 8 is a diagram of major operation wave forms of the embodiment of FIG. 7.

According to the thus constructed apparatus for controlling arc welding, the welding current is supplied in the form of pulses from the welding-current control circuit 74 to the welding portion. The welding current shown in FIG. 8a is detected by a current detector 96. The comparator operational circuit 94 then discriminates whether the level of the current is smaller than the preset level 104 of FIG. 8a. When the level is smaller than the preset level 104, the comparator operational circuit 94 produces a signal of the high level shown in FIG. 8b to the trigger circuit 92 and to the chopper circuit 84.

The temperature-measuring point 106 is positioned near the boundary of the molten pool 70 on the welding line behind the electrode 68, and the temperature at the temperature-measuring point 106 is measured by the radiation-type thermometer 76. Temperature signals shown in FIG. 8c measured by the radiation-type thermometer 76 are selected by the chopper circuit 84 only when the level of the welding current shown in FIG. 8a is decreased below the preset level 104 of FIG. 8a. The thus selected signals assume the waveform as shown in FIG. 8d through the operational amplifier circuit 86, and are sent to the peak-value detector circuit 88 which detects peak values of signals shown in FIG. 8d that are produced by the operational amplifier circuit 86, and which produces signals shown in FIG. 8f to the sample holding circuit 98. The peak-value signals shown in FIG. 8f are cleared by trigger signals (FIG. 8e) produced by the trigger circuit 92, and the peak-value detector circuit 88 prepares itself ready for detecting the peak value of the next period. The peak-value signal (FIG. 8f) detected here is sent to the sample holding circuit 98, sampled in synchronism with a signal (FIG. 8g) produced by the delay 90, and is held for a duration of one period, whereby a signal shown in FIG. 8h is produced. The thus sampled peak value is compared with the lower-limit level 108 shown in FIG. 8h by the lower-limit comparator operational circuit 100. When the level of the peak value is smaller than the lower-limit level 108 shown in FIG. 8h, the lower-limit comparator operational circuit 100 produces a high-level signal shown in FIG. 8i to the welding-current control circuit 74. Further, the thus sampled peak value is compared by the upper-level comparator operational circuit 102 with the upper level 110 shown in FIG. 8h. When the sampled peak value is higher than the upper-limit level 110 shown in FIG. 8h, the upper-limit comparator operational circuit 102 produces a high-level signal shown in FIG. 8j to the welding-current control circuit 74. Based upon the output signals from the lower-limit comparator operational circuit 100 and the upper-limit comparator operational circuit 102, the welding-current control circuit 74 increases or decreases the peak current $I_p$ to control the welding current.

According to the above-mentioned embodiment, therefore, it is possible to obtain the same effects as those of the embodiment of FIG. 1.

In this embodiment, furthermore, the electric chopper circuit 84 in the post-stage of the radiation-type thermometer 76 may be replaced by a mechanical chopper mechanism in the pre-stage of the radiation-type thermometer 76. In this case, the system which is brought into synchronism with the welding current may be provided in the chopper mechanism, or the welding current may be brought into synchronims with the chopper period.

In the embodiments illustrated in FIGS. 1 and 7, the welding current is controlled by increasing or decreasing the peak current $I_p$ in the welding current, however, may be controlled by changing the duty ratio of the welding pulse current.

In the embodiments of FIGS. 1 and 7, furthermore, the temperature of the welding portion is measured by the radiation-type thermometer which consists of a lens, an iris and an infrared ray sensor. The temperature of the welding portion, however, may be measured by the radiation-type thermometer which consists of an optical fiber, and an infrared ray sensor, or by the radiation-type thermometer which consists of an optical fiber, a lens, an iris and an optical filter.

According to the present invention as illustrated in the foregoing, it is possible to correctly measure the temperature of the molten pool and the temperature on the surface of the materials to be welded in the vicinity of the molten pool.

We claim:

1. In a method of electric arc welding by applying electric pulses between a workpiece and a welding electrode, the improvement comprising the steps of detecting the surface temperature of a molten pool at a side of the workpiece facing the welding electrode while said electric pulses are turned off, and controlling the welding conditions so that said detected surface temperature becomes equal to a predetermined temperature.

2. A method of controlling arc welding according to claim 1, wherein the temperature on the surface of said molten pool is detected by detecting the temperature at a point on a rear welding line in the welding direction.

3. In a method of electric arc welding wherein abutted workpieces are welded together by arc discharge between a welding torch and the workpieces, the improvement comprising the steps of establishing a pulsating arc discharge between the welding torch and the workpieces so as to form a molten pool at the abutting edges of the workpieces to be welded together, detecting the surface temperature of the molten pool at a side of the workpieces facing the welding torch during a welding operation at a time when the arc discharge is not established, and controlling the welding conditions during the welding operation in accordance with the detected surface temperature of the molten pool.

4. A method according to claim 3, wherein the steps of detecting the surface temperature includes detecting the surface temperature of the molten pool at the edge of the molten pool.

5. A method according to claim 3, wherein the step of controlling the welding conditions includes controlling the welding conditions so that the detected surface temperature corresponds to a predetermined temperature.

6. A method according to claim 3, wherein the step of establishing pulsating arc discharge includes applying electric pulses between the welding torch and the workpieces to be welded, and the step of controlling the welding conditions includes controlling the value of the pulses supplied for establishing the arc discharge.

7. A method according to claim 6, wherein the step of detecting the surface temperature includes detecting the surface temperature at a time between the supplying of pulses for establishing the arc discharge.

8. An apparatus for electric arc welding comprising welding torch means for establishing an arc discharge between the welding torch means and abutted workpieces to be welded so as to form a molten pool at the abutting edges of the workpieces to be welded, means for supplying a pulsating welding signal to the welding torch means so as to establish an arc discharge in accordance with supplied pulses, means for detecting the surface temperature of the molten pool at a side of the workpiece facing the welding torch means during a welding operation at a time when an arc discharge is not established, and means for controlling the welding conditions during the welding operation in accordance with the detected surface temperature of the molten pool.

9. An apparatus according to claim 8, wherein the means for detecting the surface temperature of the molten pool detects the surface temperature at the edge of the molten pool.

10. An apparatus according to claim 9, wherein the means for detecting the surface temperature of the molten pool is a radiation type thermometer.

11. An apparatus according to claim 8, wherein the means for controlling the welding conditions controls the value of the supplied pulses for establishing the arc discharge.

12. An apparatus according to claim 8, wherein the means for detecting the surface temperature detects the surface temperature during a time when no pulse is supplied for establishing the arc discharge.

13. An apparatus according to claim 8, wherein the means for controlling the welding conditions controls the welding conditions so that the detected surface temperature corresponds to a predetermined temperature.

14. An apparatus according to claim 12, wherein the means for controlling the welding conditions includes comparison means for comparing the detected surface temperature with the predetermined temperature which is predetermined in accordance with the material of the workpieces, and means for regulating the means for supplying the welding signal in accordance with the comparison.

* * * * *